United States Patent [19]

Wehner

[11] Patent Number: 5,142,457
[45] Date of Patent: Aug. 25, 1992

[54] BOAT SPOTLIGHT APPARATUS

[76] Inventor: James J. Wehner, Box 162 Smith Dr., Drifton, Pa. 18221

[21] Appl. No.: 790,825

[22] Filed: Nov. 12, 1991

[51] Int. Cl.⁵ ............................................. B60Q 1/08
[52] U.S. Cl. ..................................... 362/70; 362/611; 362/226; 362/272; 362/287; 362/286
[58] Field of Search ................. 362/35, 226, 269, 272, 362/277, 282, 286, 287, 61, 70

[56] References Cited

U.S. PATENT DOCUMENTS

| | | | |
|---|---|---|---|
| 2,510,320 | 6/1950 | Sauer | 362/368 |
| 4,535,397 | 8/1985 | May | 362/369 |
| 4,760,499 | 7/1988 | Ryou | 362/61 |
| 4,935,855 | 6/1990 | Narita | 362/286 |

*Primary Examiner*—Carroll B. Dority
*Attorney, Agent, or Firm*—Hugh E. Smith & Assoc.

[57] ABSTRACT

A spotlight apparatus is arranged for mounting to a stern or bow boat socket, including a base portion directed into the socket, with an upper handle removably mounted to the socket for use with the organization as a running light or spotlight relative to the boat structure. A modification of the invention includes the base to include a receptacle cooperative with an adapter plug structure for use of the spotlight structure within a cigarette lighter of the boat organization.

5 Claims, 5 Drawing Sheets

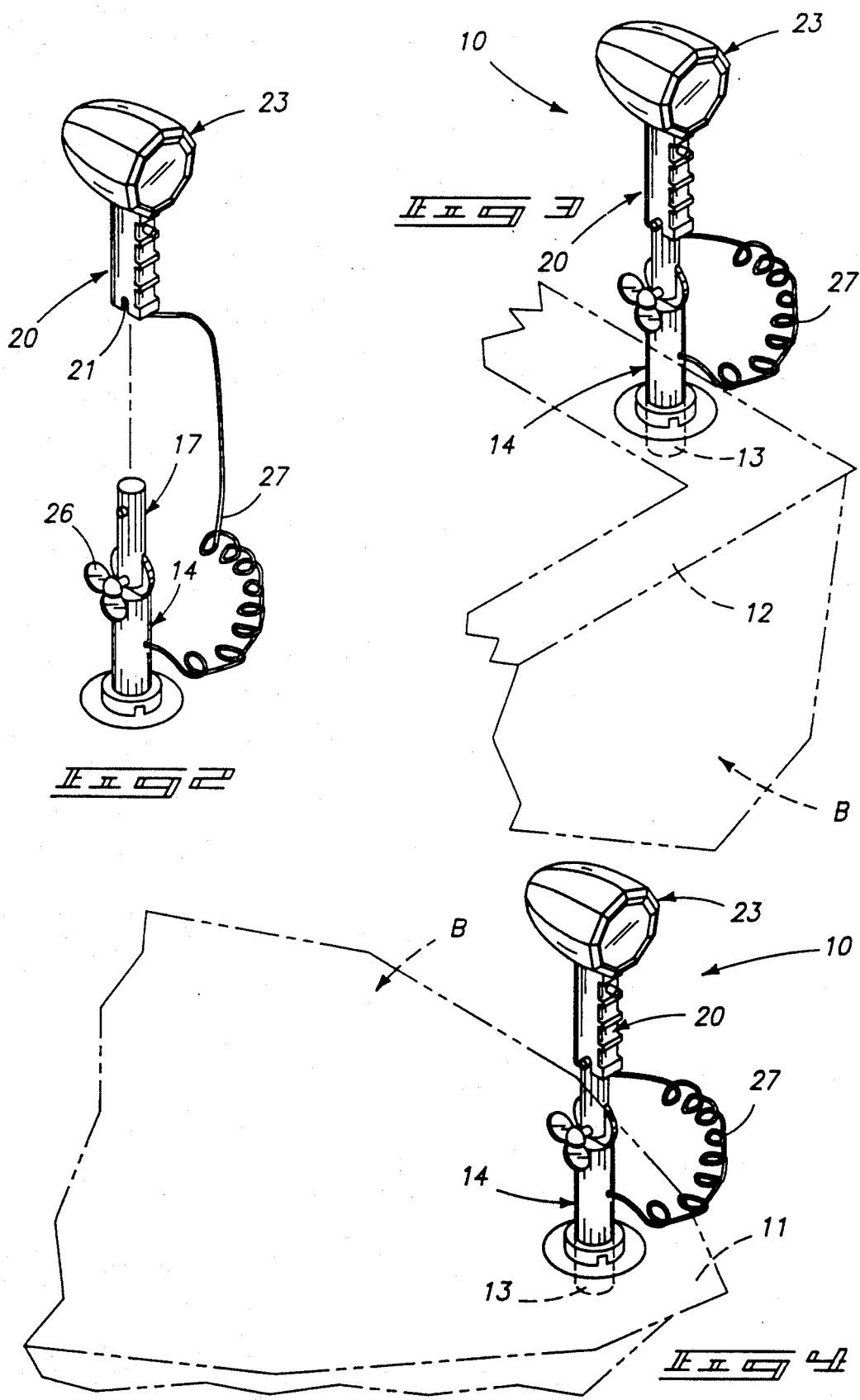

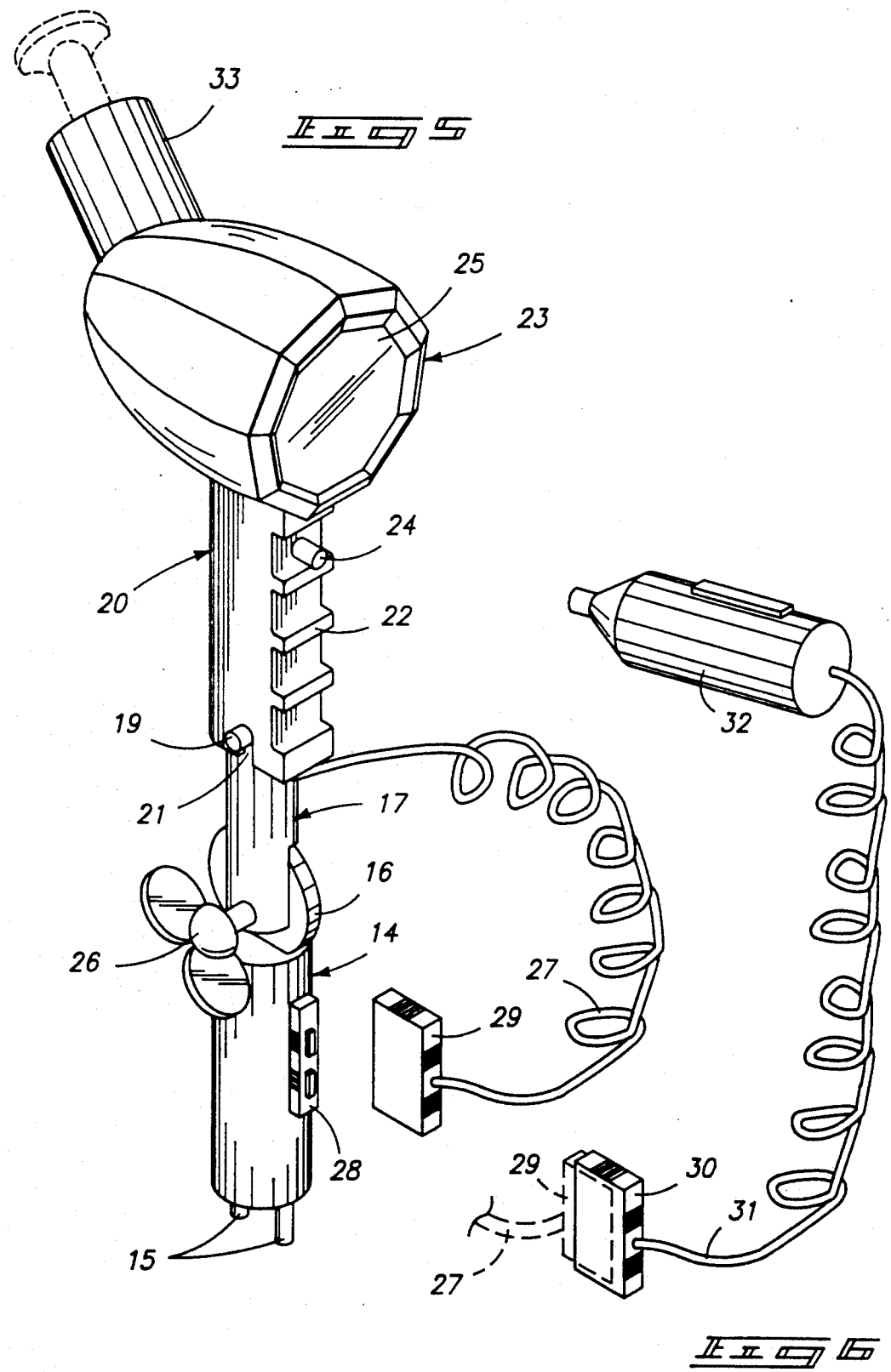

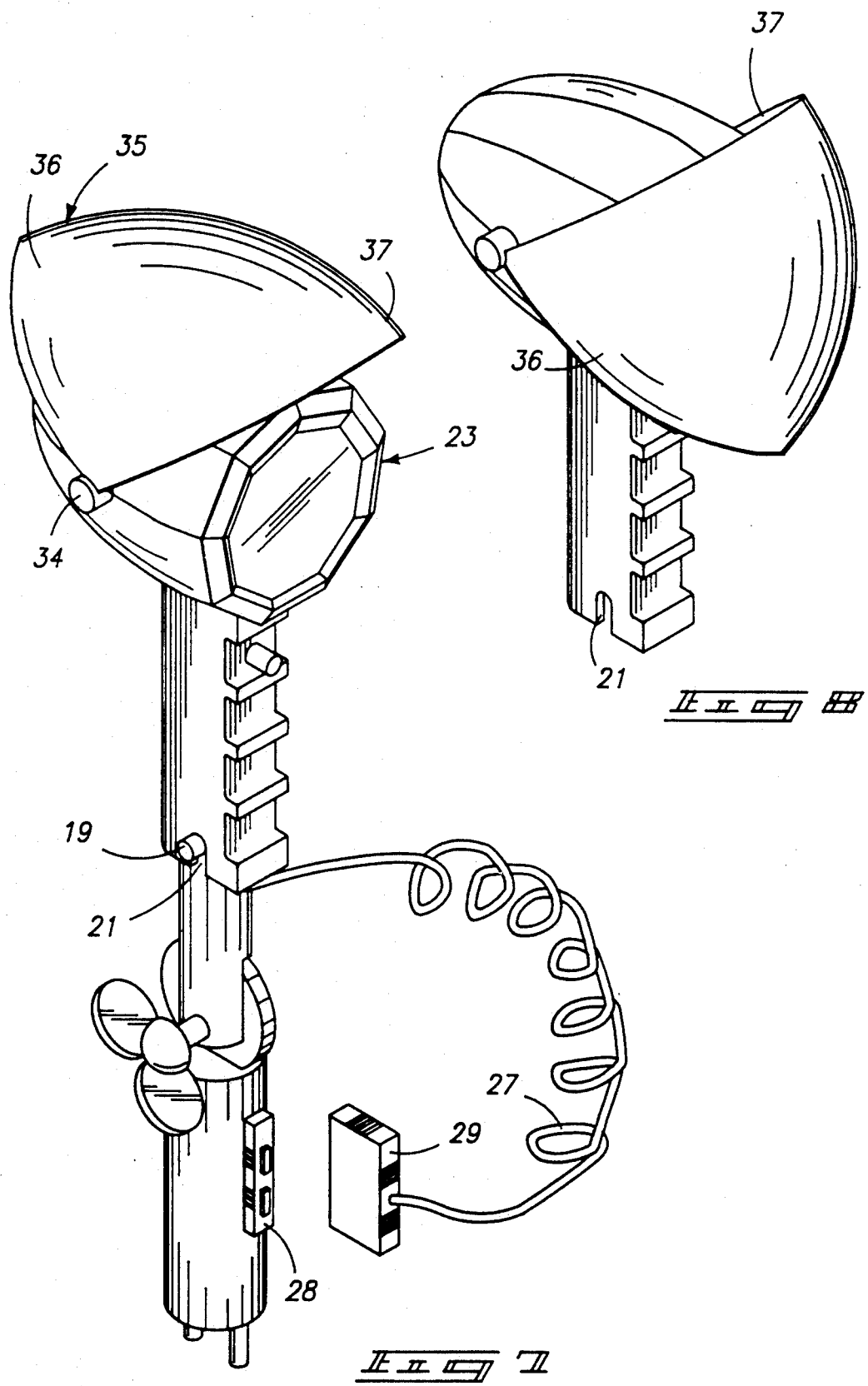

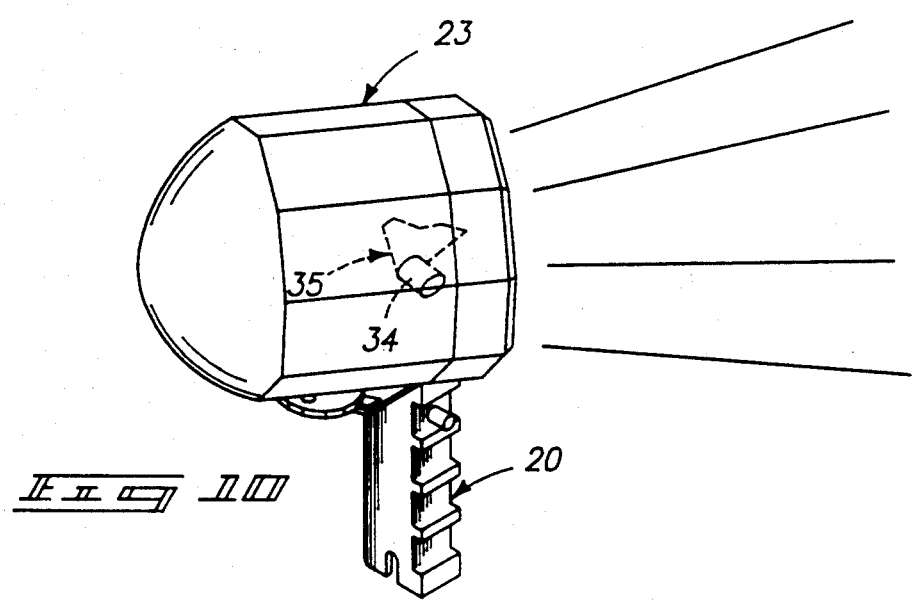
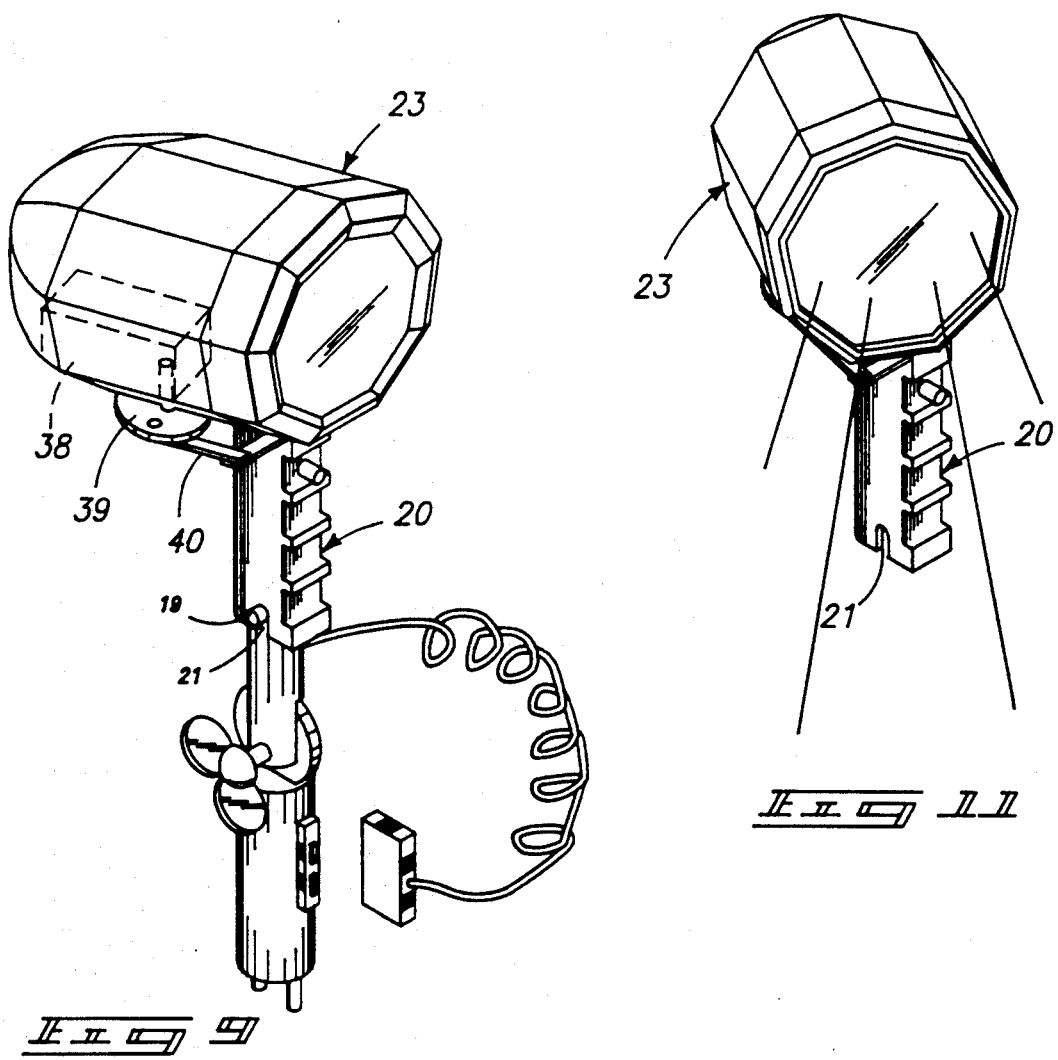

BOAT SPOTLIGHT APPARATUS

BACKGROUND OF THE INVENTION

1. Field of the Invention

The field of invention relates to boat apparatus, and more particularly pertains to a new and improved boat spotlight apparatus wherein the same is arranged for the mounting of the spotlight to a bow or stern portion of an associated boat and manipulated for remote use relative to the boat structure.

2. Description of the Prior Art

Lighting arrangements are used relative to boat structure, wherein the instant invention attempts to address the use of spotlights relative to night fishing to provide for a spotlight structure for use as a running light during operation of the boat and wherein the boat organization during anchoring permits manipulation of the spotlight relative to the boat for use in a fishing scenario.

Prior art running and spot light structure for use in boats is exemplified in the U.S. Pat. No. 4,884,173 to Cassidy wherein a bracket structure is arranged for the fixed mounting of a spotlight relative to a running light of an associated boat structure.

Portable light apparatus of various types are exemplified in the U.S. Pat. Nos. 4,228,489 to Martin; 2,165,562 to Mack, et al.; and 3,833,800 to Stewart, et al. in various situations of portable light structure.

Accordingly, it may be appreciated that there continues to be a need for a new and improved boat spotlight apparatus as set forth by the instant invention which addresses both the problems of ease of use as well as effectiveness in construction for manipulation of the spotlight structure relative to a boat and in this respect, the present invention substantially fulfills this need.

SUMMARY OF THE INVENTION

In view of the foregoing disadvantages inherent in the known types of boat lighting apparatus now present in the prior art, the present invention provides a boat spotlight apparatus wherein the same is arranged for the selective mounting of the apparatus within a stern or bow socket of a boat. As such, the general purpose of the present invention, which will be described subsequently in greater detail, is to provide a new and improved boat spot light apparatus which has all the advantages of the prior art boat lighting apparatus and none of the disadvantages.

To attain this, the present invention provides a spotlight apparatus arranged for mounting to a stern or bow boat socket, including a base portion directed into the socket, with an upper handle removably mounted to the socket for use with the organization as a running light or spotlight relative to the boat structure. A modification of the invention includes the base to include a receptacle cooperative with an adapter plug structure for use of the spotlight structure within a cigarette lighter of the boat organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved boat spotlight apparatus which has all the advantages of the prior art boat lighting apparatus and none of the disadvantages.

It is another object of the present invention to provide a new and improved boat spotlight apparatus which may be easily and efficiently manufactured and marketed.

It is a further object of the present invention to provide a new and improved boat spotlight apparatus which is of a durable and reliable construction.

An even further object of the present invention is to provide a new and improved boat spotlight apparatus which is susceptible of a low cost of manufacture with regard to both materials and labor, and which accordingly is then susceptible of low prices of sale to the consuming public, thereby making such boat spot light apparatus economically available to the buying public.

Still yet another object of the present invention is to provide a new and improved boat spotlight apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an isometric illustration of the spotlight structure removed relative to the base portion thereof.

FIG. 3 is an isometric illustration of the spotlight structure mounted within a stern socket of an associated boat.

FIG. 4 is an isometric illustration of the spotlight structure mounted within a bow portion of an associated boat.

FIG. 5 is an isometric illustration of an adapter plug structure utilized by the invention.

FIG. 6 is an isometric illustration of the adapter plug structure for use in combination with an adapter cigerette lighter member.

FIG. 7 is an isometric illustration of the invention spotlight for use with a translucent visor in use of the spot light as a running light.

FIG. 8 is an isometric illustration of the visor structure in a lowered orientation relative to the spotlight structure.

FIG. 9 is an isometric illustration of an oscillating structure for use with the invention.

FIG. 10 is an isometric illustration of the spotlight oscillating structure removed relative to the base portion.

FIG. 11 is a further isometric illustration of the oscillating spotlight structure oscillating relative to the handle portion thereof.

DESCRIPTION OF THE PREFERRED EMBODIMENT

Figure 1:
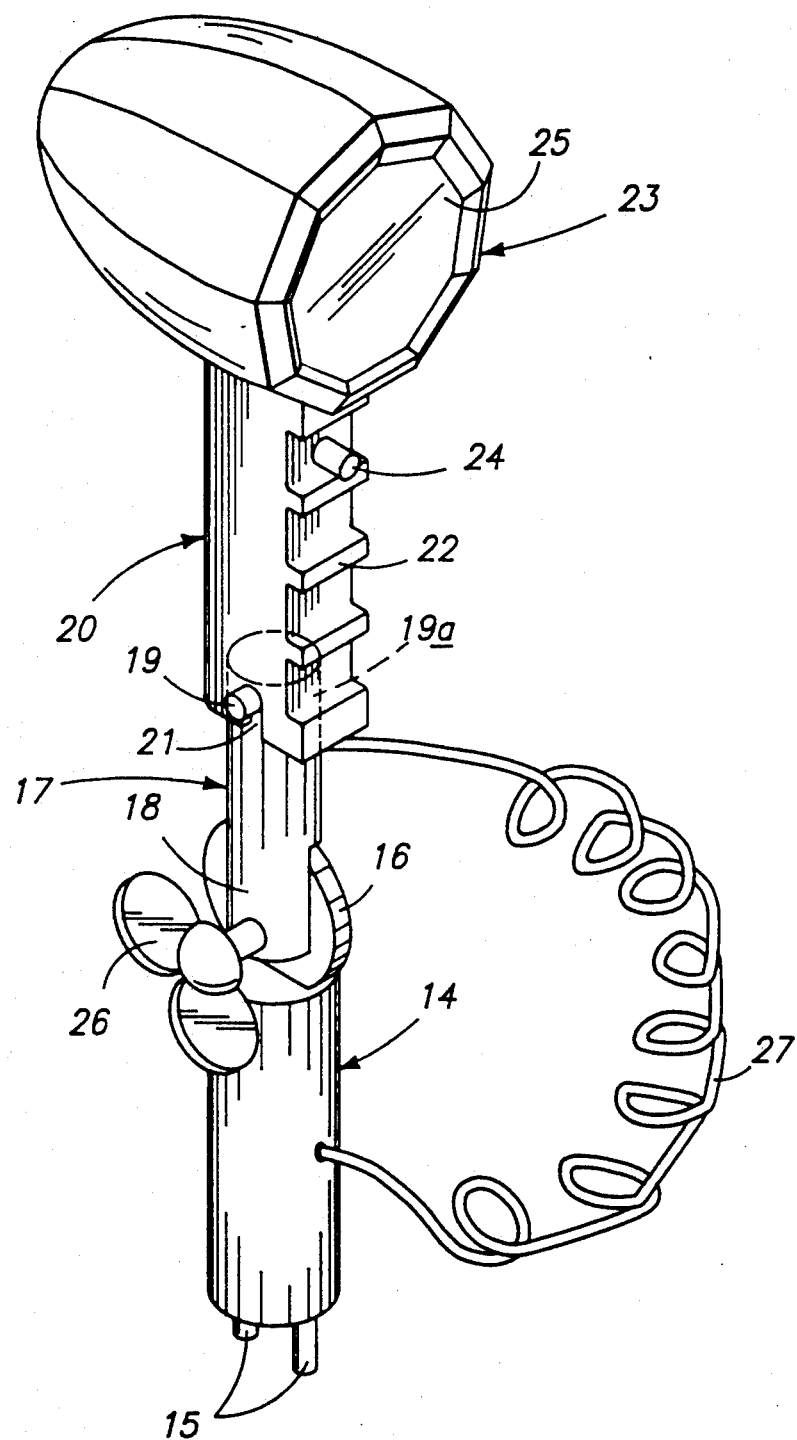
FIG. 1 is an isometric illustration of the spotlight structure utilized by the invention.

With reference now to the drawings, and in particular to FIG. 1 to 11 thereof, a new and improved boat spotlight apparatus embodying the principles and concepts of the present invention and generally designated by the references numeral 10 will be described.

More specifically, the boat spotlight apparatus 10 of tne instant invention essentially comprises a spotlight member, as illustrated in FIG 1 for example, arranged for reception within an illumination light socket 13 (see FIGS. 3 and 4) mounted within the bow 11 or stern 12 of an associated boat "B". The spotlight member includes a base plug 14, including electrical connector projections 15 arranged for projection within the light socket 13. A boss plate 16 is formed to an upper distal end of the base plug 14 received within a bifurcated lower terminal end 18 of a base plug extension 17, with a fastener shaft 26 directed through the bifurcated lower end 18 and the associated boss plate 16 to permit selective rotation of the extension 17 about the boss plate 16 by selective clamping of the fastener shaft 26. A support pin 19 diametrically directed through an upper terminal end of the extension 17 permits the selective mounting of a spotlight handle 20 to the upper terminal end of the extension 17. The handle 20 includes a plurality of diametrically aligned handle slots 21 arranged for reception of the support pin 19 within the slots as the pin 19 is arranged for the lateral projection exteriorly of the handle 17. The upper terminal end of the extension 17 accordingly is received within a handle socket 19a (see FIG. 1). In this manner, the spotlight handle 20 is removably mounted relative to the extension 17 permitting the selective use of the spotlight member as a running light and as a spotlight for manual manipulation during night fishing. The spotlight handle 20 includes a rib forward surface 22 positioned below an associated lens 25 of an illumination head 23. An on/off switch 24 effects selective actuation of the illumination head and wherein an electrical power supply cord 27 in electrical communication with the electrical connector projections 15 is directed into the handle 20 as the electrical power supply cord 27 permits remote manual manipulation of the handle 20 relative to the base plug 14.

The FIG. 6 illustrates the hamndle 14 to include a base plug electrical socket 28 to selectively receive a base plug electrical plug 29 that in turn is in electrical communication through the electrical power supply cord 27 to the illumination head 23. In this manner, an adapter structure, such as illustrated in FIG. 6, to include a cigarette lighter adapter plug 32 and its associated adapter electrical supply cord 31 is in electrical communication with an adapter socket receptacle 30 to receive the base plug electrical socket 28 therewithin to provide for utilization of the illumination head 23 with a cigarette lighter socket of a conventional type (not shown) to be found in contemporary boat construction. As the electrical cigarette lighter socket in this manner would be utilized the illumination head 23, as ilustrated in FIG. 6, is provided with a cigarette lighter adapter socket 33.

The FIGS. 7 and 8 exemplify the additional use of a translucent visor 35 mounted about an illumination head pivot axle 34 directed through the illumination head, wherein the visor 35 is formed with a respective green right visor portion and a red left visor portion 36 and 37 respectively for use in the bow of a boat in accordance with Coast Guard regulations for running lights in a boat bow.

The FIGS. 9-11 further set forth the organization for use with an oscillation drive, wherein a drive motor 38 is in communication with a drive cam 39 to effect rotation of the drive cam, wherein drive linkage 40 eccentric mounting to the drive cam 39 and to the head 23 effects oscillation of the head during rotation of the drive cam 39 by the drive motor 38 to provide for oscillation of the illumination head during use in a fishing scenario.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A boat spotlight apparatus in combination with a boat member, wherein the boat member includes a boat bow and a boat stern, the boat bow including a first light socket, and the boat stern including a second light socket, wherein the apparatus comprises,
   a spotlight member having an illumination head and arranged for selective reception with the first light socket and the second light socket selectively, wherein the spotlight member includes a spotlight base plug, the base plug including electrical projections for reception within one of said first and second light sockets, wherein the electrical projections are mounted to a lower distal end of the base plug, and the base plug includes a boss plate extending above the base plug integrally mounted to an upper terminal end thereof, and further including a spotlight extension, the spotlight extension including a lower bifurcated end, wherein the lower bifurcated end is arranged for receiving the boss plate therewithin, and the lower bifurcated end includes a fastener shaft orthogonally directed through the boss plate and the lower bifurcated end to effect selective clamping of the spotlight extension relative to the base plug to permit selective pivotment of the spotlight extension relative to the base plug, and the extension including an extension upper distal end and the extension upper distal end includes a support pin diametrically directed through the spotlight extension, and a spotlight handle, the spotlight handle including a handle socket arranged for receiving the spotlight extension therewithin, and the spotlight handle includes diametrically opposed slots for receiving the support pin, and the spotlight handle includes an illumination head mounted to an upper distal end of the spotlight handle, and an on/off switch mounted within the handle for affecting selective actuation of the illumination head, and an electrical power supply cord connected to the on/off switch.

2. An apparatus as set forth in claim 1 wherein the base plug includes a base plug electrical socket, and the electrical power supply cord includes a base plug electrical plug mounted to a lower distal end of the electrical power supply cord for selective securement to the base plug electrical socket, and an adapter member, wherein the adapter member includes an adapter socket receptacle for selective reception of the base plug electrical plug therewithin, and the adapter member further includes an adapter electrical supply cord in electrical communication with the adapter socket receptacle at a lower distal end of the adapter electrical supply cord, and an upper distal end of the adapter electrical supply cord including a cigarette lighter adapter plug for projection within a cigarette lighter.

3. An apparatus as set fourth in claim 2 including a cigarette lighter adapter plug mounted to the illumination head.

4. An apparatus as set forth in claim, 3 wherein the illumination head includes an illumination head pivot axle directed through the illumination head, and the illumination head pivot axle includes a translucent visor pivotally mounted to the pivot axle, and the illumination head includes an illumination lens, and the translucent visor pivoted from a first position spaced above the illumination lens, and pivoted to a second down position in confronting relationship relative to the illumination lens, and the translucent visor including a right visor portion of a first coloration, and a left visor portion of a second coloration.

5. An apparatus as set forth in claim 4 wherein the illumination head includes a drive motor, the drive motor including a drive cam rotatably mounted to the drive motor, the drive cam including drive linkage eccentrically mounted to the drive cam at a first end of the drive linkage, and a second end of the drive linkage mounted to the illumination head to effect oscillation of the illumination head upon rotation of the drive cam.

* * * * *